(12) United States Patent
Yu

(10) Patent No.: US 6,938,345 B2
(45) Date of Patent: Sep. 6, 2005

(54) COMBINATION UTILITY KNIFE

(76) Inventor: Zu Sheng Yu, 31 Bayview Dr., Huntington, NY (US) 11743

(*) Notice: Subject to any disclaimer, the term of this patent is extended or adjusted under 35 U.S.C. 154(b) by 0 days.

(21) Appl. No.: 10/458,963

(22) Filed: Jun. 11, 2003

(65) Prior Publication Data
US 2004/0250423 A1 Dec. 16, 2004

(51) Int. Cl.$^7$ ............................ B43L 25/00; B26B 1/08; B26B 11/00; B25F 1/00
(52) U.S. Cl. ......................... 30/123; 30/457; 30/162; 30/125; 30/335; 30/320; 30/122; 30/2; 7/160; 7/170
(58) Field of Search ......................... 30/2, 335, 320, 30/451, 457–459, 122–125, 162, 278, 289, 317, 353; 7/170, 118, 156, 158, 160; D19/36, 73, 77, 81; D8/99, 105

(56) References Cited

U.S. PATENT DOCUMENTS

| 497,897 A | * | 5/1893 | Schickler | 30/123 |
|---|---|---|---|---|
| 2,256,707 A | * | 9/1941 | Fultz | 30/459 |
| 4,242,795 A | * | 1/1981 | Rollband et al. | 30/162 |
| 4,248,283 A | * | 2/1981 | Kaye | 30/454 |
| 4,631,829 A | * | 12/1986 | Schmidt et al. | 30/294 |
| 4,635,309 A | * | 1/1987 | Larsen | 7/158 |
| 4,891,881 A | * | 1/1990 | Mills | 30/123 |
| 5,315,760 A | * | 5/1994 | Emerson | 30/123 |
| 5,557,818 A | * | 9/1996 | Leon | 7/160 |
| 5,584,123 A | * | 12/1996 | Chi | 30/125 |
| 5,979,058 A | * | 11/1999 | Henke | 30/143 |
| 6,219,869 B1 | * | 4/2001 | Burba | 7/118 |
| 6,289,597 B1 | * | 9/2001 | Beyers | 33/414 |
| 6,363,614 B1 | * | 4/2002 | Umstead et al. | 30/144 |

* cited by examiner

Primary Examiner—Boyer D. Ashley
(74) Attorney, Agent, or Firm—F. Chau & Associates, LLC

(57) ABSTRACT

A retractable blade utility knife includes a knife housing, a blade, a pencil housing, a pencil sharpening slot, and a rear cover. The knife may further include a rope-cutting recess and a cutting surface in a lower end and a sawing surface in an upper end of the blade. The pencil housing forms in a lower rear part of the knife housing to keep hold of a pencil. The pencil sharpening slot is connected to a conical bore and a pencil chips storage room. The rope-cutting recess facilitates rope cutting by the blade. The blade carrier carries the blade and slides along a longitudinal axis of a knife groove formed in one side of the knife housing. The rear cover of the knife includes a pencil inlet hole and a rear cover fixed switch. The rear cover is detachably coupled to a rear portion of the knife housing via the rear cover fixed switch. The rear cover includes a pencil chip storage space and a pencil chip outlet.

21 Claims, 4 Drawing Sheets

COMBINATION UTILITY KNIFE

BACKGROUND

1. Field of the Invention

The present invention relates to a multifunction utility knife and, more particularly, to a utility knife with one or more pencil, a pencil-sharpening slot, and a blade with an opposing saw tooth.

2. Discussion of Related Art

Utility knives having a fixed blade lock blades into a fixed, often non-retractable position of a knife housing. In comparison with the fixed blade knives, retractable blade knives offer the convenience of being able to quickly adjust the cutting depth of the blades as well as safe usage of allowing the blade to be retracted completely into a knife housing when not in use. Typically, the retractable blade knives include a knife housing and a blade, which is retracted into the knife housing.

Retractable blade knives are often used by construction workmen or artists to cut a workpiece into various shapes. The user is likely to use a marker such as a pencil to mark or draw on a work piece prior to cutting to precisely complete the cuts. It is inconvenient in such a case to carry a knife and a pencil, and possibly a pencil sharpener separately.

When a knife is used to precisely cut work pieces, the same knife blade may not be suitable for cutting a string, rope, or wire. In some instances, a knife blade may not be able to cut into a hard material, such as cardboard. In such case, a saw blade may be useful. A need therefore exists for a utility knife capable of carrying and sharpening a pencil when necessary and of cutting a rope as well as sawing a hard material.

When a built-in pencil sharpener is used, a blade of the pencil sharpener becomes dull. Then the pencil sharpener is no longer useful. A need therefore exists for a utility knife capable of carrying a pencil sharpener providing a new blade when needed.

SUMMARY OF THE INVENTION

The present invention is directed to a retractable utility knife with a pencil capable of cutting and sawing a rope, and capable of sharpening the pencil thereof when needed. The retractable blade utility knife according to an embodiment of the present invention comprises a knife housing, a blade having a cutting surface in a lower edge and a sawing surface in an upper edge of the blade, a pencil housing formed in a lower rear part of the knife housing to keep hold of a pencil, a pencil sharpener slot formed in the knife housing for facilitating a sharpening operation, a blade carrier for carrying the blade and for sliding along a longitudinal axis of a knife groove formed in one side of the knife housing, and a rear cover of the knife having a pencil inlet hole and a rear cover fixed switch, the rear cover releasebly coupled to a rear portion of the knife housing via the rear cover fixed switch, thereby providing a pencil chip storage room when closed to store pencil chips and a pencil chip outlet when detached to empty the pencil chips, wherein the blade carrier is detachably connected to a rear end of the blade through a blade fixed switch.

The retractable blade utility knife also comprises a rope-cutting recess for exposing a portion of the lower edge of the blade for facilitating rope cutting by the blade irrespective of whatever the blade is extracted or retracted, and a rope cutting extension positioned adjacent to the rope-cutting recess and transverse to the lower edge of the blade for preventing a rope from accessing to the rope-cutting recess from a direction transverse to the lower edge of the blade.

In this embodiment, the knife housing includes a pencil-sharpening slot in which a blade of the knife is positioned to sharpen a pencil based on a pencil rotation operation. Here, the pencil chip storage room is connected through the pencil-sharpening slot to a conical bore for providing a path for pencil chips resulted from the pencil rotation operation.

BRIEF DESCRIPTION OF THE DRAWINGS

A more complete appreciation of the invention, and many of the attendant advantages thereof, will be readily apparent with reference to the following detailed description when considered in conjunction with the accompanying drawings in which like reference symbols indicate the same or the similar components, wherein.

DETAILED DESCRIPTION OF PREFERRED EMBODIMENTS

Preferred embodiments of the present invention will now be described hereinafter with reference to the accompanying drawings. The present invention may, however, be embodied in many different forms and should not be construed as limited to the embodiments set forth herein.

Figure 1:
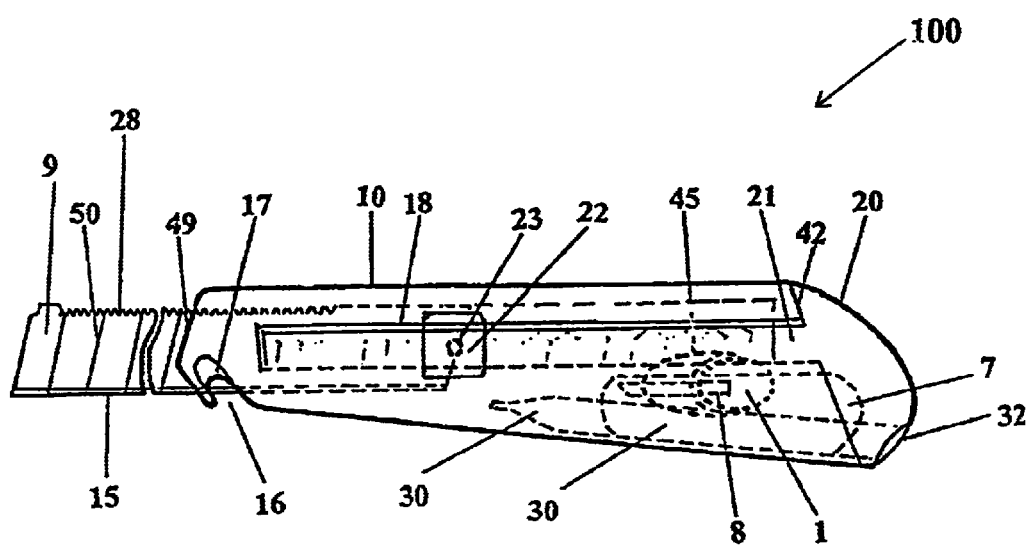
FIG. 1 is a left side view of a utility knife when a retractable blade is extended out of a knife housing according to an embodiment of the present invention.
Figure 2:
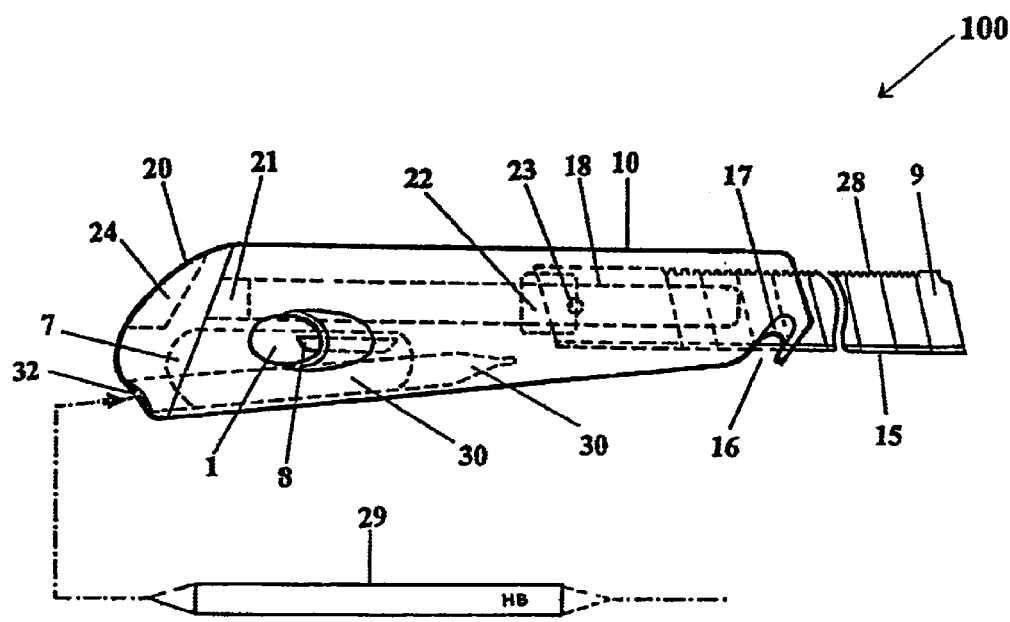
FIG. 2 is a right side view of an exterior of a utility knife when a retractable blade is extended out of a knife housing according to an embodiment of the present invention.
Figure 3:
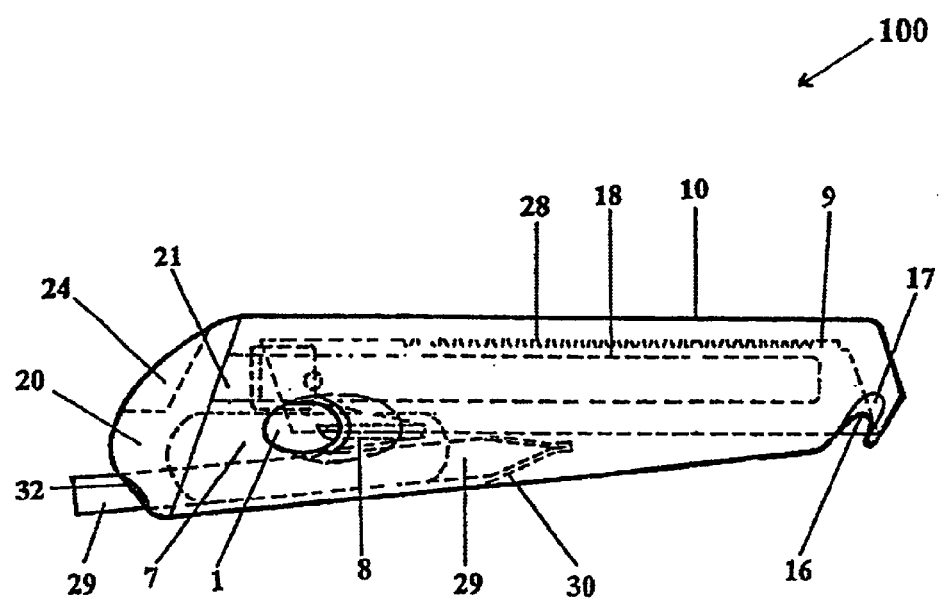
FIG. 3 is a right side view of a utility knife when a retractable blade is retracted into a knife housing according to an embodiment of the present invention.
Figure 4B:
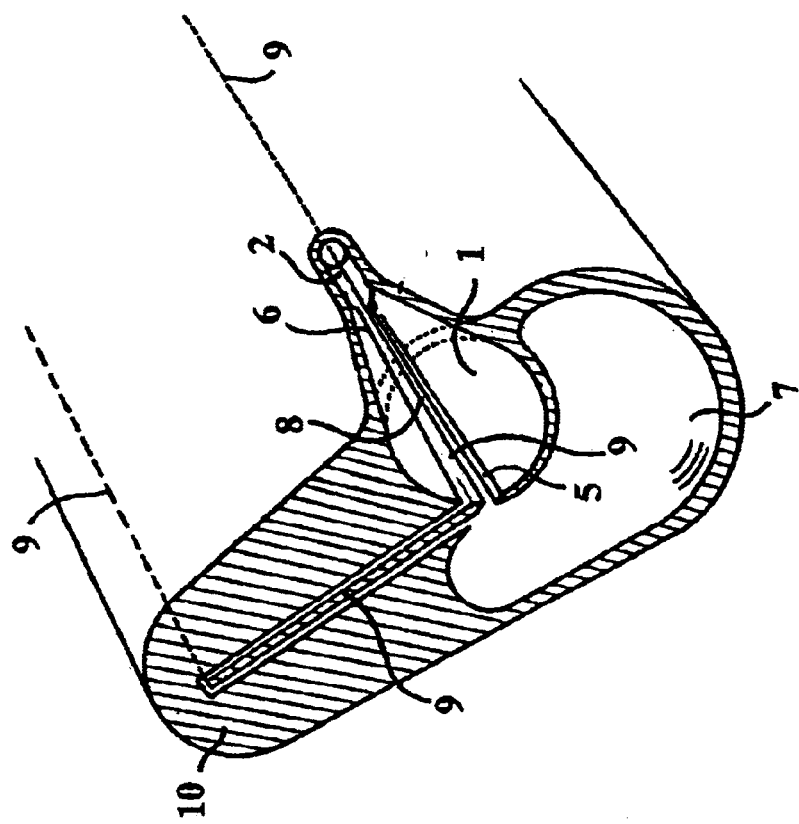
FIG. 4(b) is a rear side view of a pencil-sharpening slot shown from a different angle.
Figure 4A:
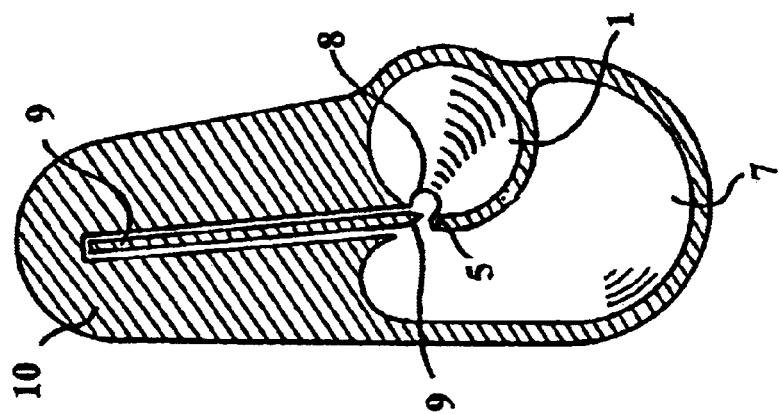
FIG. 4(a) is a rear side view of a pencil sharpening slot connected to a pencil chips storage room and a conical bore.

Referring to FIGS. 1, 2, 3, 4(a), and 4(b), there is illustrated a retractable utility knife according to an embodiment of the present invention. FIG. 1 is a left side view of a utility knife when a retractable blade is extended out of a knife housing according to an embodiment of the present invention. FIG. 2 is a right side view of a utility knife when a retractable blade is extended out of the housing according to an embodiment of the present invention.

The utility knife 100 includes a blade 9 and a knife housing 10 molded as a unitary structure using suitable materials such as plastics or metals.

The knife housing 10 has a carrier groove 18, extending to the right hand end 42. The blade 9 of the knife moves back and forth with a blade carrier 22 along a knife groove 45. The blade 9 has an upper edge and a lower edge, the lower edge forming a cutting surface and the upper edge forming a sawing surface 28. The knife housing 10 also includes a pencil storage room 30, and a pencil chip storage room 7. The blade carrier is connected through a blade fixed switch 23 to the blade of the knife.

The knife housing 10 includes a conical bore 1, a pencil storage room 30, and a pencil chip storage room 7. The conical bore's longitudinal axis is slightly tilted to the housing. A pencil sharpening slot 8 is formed between a first side wall 5 and a second side wall 6 of the conical bore 1.

A knife groove 45 is formed extending longitudinally of the housing to provide a guide way for the blade 9.

A rope-cutting recess 16 is provided for cutting a rope and the like by forming a U type of recess in a lower front end portion of the knife housing. The rope-cutting recess exposes a portion of the lower edge of the blade for facilitating rope cutting by the blade irrespective of whatever the blade is extracted or retracted. The rope-cutting recess 16 has a rope-cutting extension 17, which facilitates firm grip of the rope in the rope-cutting recess 16. The rope-cutting extension 17 positioned adjacent to the rope-cutting recess and transverse to the lower edge of the blade for preventing a rope from accessing to the rope-cutting recess 16 from a direction transverse to the lower edge of the blade.

The blade 9 includes a cutting surface 15 in a lower edge and a sawing surface 28 in the opposite upper edge of the blade. The blade is preferably formed with a series of score lines 50 parallel to a front edge 49 so that when a sharp new point is required this can be obtained by snapping off a section of the leading score line by inserting the section into a blade breaking slot 24. The front edge 49 of the knife housing 10 has a slot in alignment with the knife groove 45 so that the front end of the blade may protrude therethrough when it is extended into cutting positions as shown in FIGS. 1 and 2. In accordance with the invention, the blade is firmly positioned, and also extended and retracted, by combination of the blade carrier, the carrier groove, and the knife groove best shown viewed in perspective in FIG. 1.

The blade carrier 22 is coupled to one end of the blade for carrying the blade and for sliding along a longitudinal axis of the carrier groove formed in the housing 10. The blade carrier is preferably a unitary structure of molded plastic material having resilience and low friction properties. The blade carrier is maintained in a retracted position when the knife is not in use as in FIG. 3. Excess backward movement of the blade in retraction is prevented by the rear cover fixed switch 21. The carrier groove 18 is formed at the knife housing 10 to provide a sliding path therefor. The groove is open at the rear end of the housing so that the rear cover fixed switch 21 is slid into the rear portion of the carrier groove to couple the rear cover 20 to the knife housing 10.

In FIG. 1, the rear cover 20 includes a pencil inlet hole 32 and the rear cover fixed switch 21. The rear cover 20 is coupled to a rear portion of the knife housing via the rear cover fixed switch 21 for providing a pencil chip storage room 7 to store pencil chips therein. The pencil chip storage room 7 can be emptied by releasing the rear cover fixed switch 21 from the knife housing 10. The pencil chip storage room 7 is connected through a pencil sharpening slot 8 to a conical bore 1 for providing a path for pencil chips resulted from a sharpening operation. A pencil storage room 30 (not shown in FIGS. 4(*a*) and 4(*b*)) is formed in a lower rear part of the knife housing 10. The rear cover has an inlet hole 32 for aligning a pencil 29 with the pencil storage room 30.

FIGS. 4(*a*) and 4(*b*) are rear side views of the housing of the knife shown in FIG. 1. A conical bore 1 includes a pencil lead extension slot 2, a first side wall 5 spaced from a second side wall 6. A blade 9 of the knife projects into the conical bore 1, whereupon projection of a pencil within the conical bore 1 effects sharpening upon rotation of the pencil 29 within the bore 1.

It will be appreciated by those skilled in the art that the utility knife 100 of the present invention exhibits several advantages over prior art utility knives.

First, the utility knife 100 uses a blade of a knife for a blade of a pencil-sharpening slot at the same time. This is a particularly desirable features since the changes of a pencil-sharpening blade allows maintenance of a sharp blade for the pencil sharpening slot.

Second, the utility knife 100 allows uses of sawing and cutting at the same time. This is a particularly desirable feature when two different objects, such as a paper and a cardboard, need to be cut and sawed during the same project.

Another advantage of the utility knife is that it allows readiness of cutting a rope and the like. Such a rope-cutting extension at a front portion of the knife housing facilitates firm grip of the rope in the knife to maintain a targeted area thereof so that the blade can be prevented from deformation as well as the rope can be cut precisely.

A further advantage of the knife is that it allows a clean operation in sharpening the pencil because it has a built-in pencil chip storage space so that the results such as pencil chips from sharpening operation are stored inside the knife for later evacuation. In addition, since a pencil is available which is kept in a pencil storage room of the knife, the user is allowed to draw or mark with a pencil whenever necessary prior to or while cutting without separately accompanying the pencil.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A retractable blade utility knife, comprising:
 a knife housing;
 a blade comprising a first portion protruding out of the knife housing when the blade is extended, the blade having an upper edge and lower edge, the lower edge forming a cutting surface;
 a pencil sharpening slot receiving a second portion of the blade for facilitating a sharpening operation of a marking instrument, wherein the pencil sharpening slot is disposed between a first wall and a second wall of a conical bore that receives the marking instrument;
 a pencil housing formed in the knife housing for housing the marking instrument; and
 a blade carrier for carrying the blade back and forth, the blade carrier sliding along a longitudinal axis of a carrier groove formed in one side of the knife housing.

2. The retractable blade utility knife according to claim 1, wherein the upper edge includes a saw tooth for facilitating a sawing operation.

3. The retractable blade utility knife according to claim 1, wherein a pencil chip storage room is connected through the pencil-sharpening slot to the conical bore.

4. The retractable blade utility knife according to claim 1, the blade is detachably connected to the blade carrier through a blade fixed switch.

5. The retractable blade utility knife according to claim 1, further comprising a rear cover of the knife having a pencil inlet hole and a rear cover fixed switch, the rear cover releasably coupled to a rear portion of the knife housing via the rear cover fixed switch, thereby providing a pencil chip storage room.

6. The retractable blade utility knife according to claim 1, wherein the knife housing comprises a rope-cutting recess for exposing a portion of the lower edge of the blade for facilitating rope cutting by the blade irrespective of whether the blade is extended or retracted.

7. The retractable blade utility knife according to claim 6, wherein the knife housing further includes an extension positioned adjacent to the rope-cutting recess and transverse to the lower edge of the blade for preventing access to the rope-cutting recess from a direction transverse to the lower edge of the blade.

8. A retractable blade utility knife, comprising:
   a knife housing;
   a blade comprising a first portion protruding out of the knife housing when the blade is extended, the blade having a cutting surface in a lower edge;
   a rope-cutting recess for exposing a portion of the lower edge of the blade for facilitating rope cutting by the blade irrespective of whether the blade is extended or retracted; and
   a pencil sharpening slot receiving a second portion of the blade for facilitating a sharpening operation of a marking instrument, wherein the pencil sharpening slot is disposed between a first wall and a second wall of a conical bore that receives the marking instrument.

9. The retractable blade utility knife according to claim 8, wherein the blade has a sawing surface in an upper edge.

10. The retractable blade utility knife according to claim 8, further comprising a pencil housing formed in a lower rear part of the knife housing to keep hold of a pencil.

11. The retractable blade utility knife according to claim 8, wherein the knife housing further includes an extension positioned adjacent to the rope-cutting recess and transverse to the lower edge of the blade for preventing access to the rope-cutting recess from a direction transverse to the lower edge of the blade.

12. The retractable blade utility knife according to claim 8, further comprising a pencil chip storage room which is formed by releasably coupling a rear cover of the knife to the rear end of the knife to store pencil chips.

13. The retractable blade utility knife according to claim 12, wherein the pencil chip storage room is connected through the pencil-sharpening slot to a the conical bore.

14. A retractable blade utility knife, comprising:
   a knife housing;
   a retractable blade comprising a first portion protruding out of the knife housing when the blade is extended, the retractable blade having a cutting surface in a lower edge; and
   a pencil sharpening slot receiving a second portion of the retractable blade for facilitating a sharpening operation of a marking instrument, wherein the pencil sharpening slot is disposed between a first wall and a second wall of a conical bore that receives the marking instrument.

15. The retractable blade utility knife according to claim 14, wherein the retractable blade has a sawing surface in an upper edge.

16. The retractable blade utility knife according to claim 14, further comprising a pencil housing formed in a lower rear part of the knife housing to house a pencil.

17. The retractable blade utility knife according to claim 14, further comprising a pencil chip storage room releasably coupling a rear cover of the knife to the rear end of the knife to store pencil chips.

18. The retractable blade utility knife according to claim 17, the pencil chip storage room is connected through the pencil-sharpening slot to the conical bore.

19. The retractable blade utility knife according to claim 14, further comprising a rope-cutting recess for exposing a portion of the lower edge of the retractable blade for facilitating rope culling by the blade irrespective of whether the retractable blade is extended or retracted.

20. The retractable blade utility knife according to claim 19, wherein the knife housing further includes an extension positioned adjacent to the rope-culling recess and transverse to the lower edge of the retractable blade for preventing access to the rope-cutting recess from a direction transverse to the lower edge of the retractable blade.

21. A retractable blade utility knife, comprising:
   a knife housing;
   a blade having an upper edge and lower edge, the lower edge forming a cutting surface;
   a pencil sharpening slot for facilitating a sharpening operation of a marking instrument, the slot being positioned for sharpening a pencil by using the blade;
   a pencil housing formed in the knife housing for housing a marking instrument;
   a blade carrier for carrying the blade back and forth, the blade carrier sliding along a longitudinal axis of a carrier groove formed in one side of the knife housing; and
   a rear cover of the knife having a pencil inlet hole and a rear cover fixed switch, the rear cover releasably coupled to a rear portion of the knife housing via the rear cover fixed switch, thereby providing a pencil chip storage room.

* * * * *